United States Patent
Finley et al.

(10) Patent No.: US 9,328,624 B2
(45) Date of Patent: May 3, 2016

(54) HYDROCRATIC GENERATOR WITH MEMBRANE WALL

(71) Applicants: Warren Finley, Mission Viejo, CA (US); Anthony T Jones, Mission Viejo, CA (US)

(72) Inventors: Warren Finley, Mission Viejo, CA (US); Anthony T Jones, Mission Viejo, CA (US)

( * ) Notice: Subject to any disclaimer, the term of this patent is extended or adjusted under 35 U.S.C. 154(b) by 0 days.

(21) Appl. No.: 14/558,530

(22) Filed: Dec. 2, 2014

(65) Prior Publication Data

US 2015/0322810 A1 Nov. 12, 2015

Related U.S. Application Data

(63) Continuation-in-part of application No. 14/444,707, filed on Jul. 28, 2014, now abandoned.

(60) Provisional application No. 61/858,827, filed on Jul. 26, 2013.

(51) Int. Cl.
*F03D 9/00* (2006.01)
*F01D 15/10* (2006.01)
*H02K 7/18* (2006.01)

(52) U.S. Cl.
CPC .............. *F01D 15/10* (2013.01); *H02K 7/1823* (2013.01)

(58) Field of Classification Search
CPC ....................................................... F03B 13/00
USPC ............................................................ 290/54
See application file for complete search history.

(56) References Cited

U.S. PATENT DOCUMENTS

| | | | | | |
|---|---|---|---|---|---|
| 4,947,647 A | * | 8/1990 | Jensen | ..................... | F03B 17/00 60/398 |
| 5,106,230 A | * | 4/1992 | Finley | ..................... | A01K 61/02 119/200 |
| 9,157,332 B2 | * | 10/2015 | Hanna | ..................... | F01D 15/10 |
| 2003/0173784 A1 | * | 9/2003 | Jones | ..................... | B01F 3/0865 290/54 |
| 2006/0012178 A1 | * | 1/2006 | Finley | ..................... | F03B 13/00 290/1 R |
| 2006/0226656 A1 | * | 10/2006 | Finley | ..................... | F03B 13/00 290/1 R |
| 2007/0257493 A1 | * | 11/2007 | Alstot | ..................... | F03B 13/00 290/54 |

* cited by examiner

*Primary Examiner* — Joseph Waks
(74) *Attorney, Agent, or Firm* — Colin P. Abrahams

(57) ABSTRACT

A hydrocratic generator comprises a generally horizontal solid pipe and an inner tube, and an annular space formed between the solid pipe and the inner tube. The solid pipe receives a first aqueous solution and the inner tube receives a second aqueous solution. The inner tube is comprised of a membrane wall which facilitates the mixing between the first and the second aqueous solution.

20 Claims, 17 Drawing Sheets

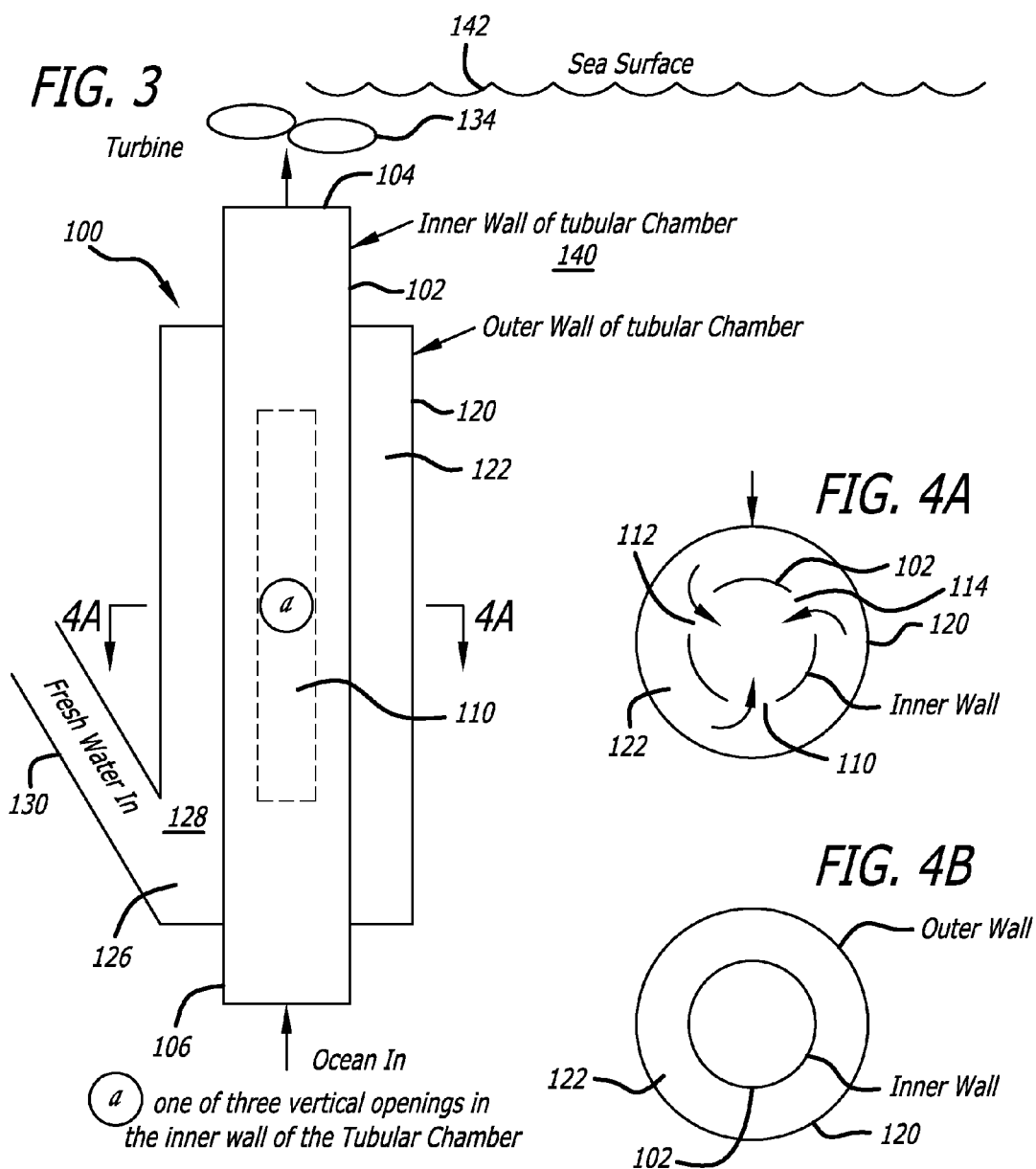

① Left lower corner of the opening is Right of the SLOT
② Sleeve rotates Clockwise. Thereby exposing the slot to sea water progressively as it Rotates
③ to close and stop operation, sleeve rotates counter clockwise Hydrocratic Power Plant
Brine into Sea Water
Support Wall Collection Tubes Power Tubes 3" ID tubes to Power Plants Area of 41.5" ID Tubes equals Area of one 3" ID Tube Support Wall Hydrocratic Power Plants
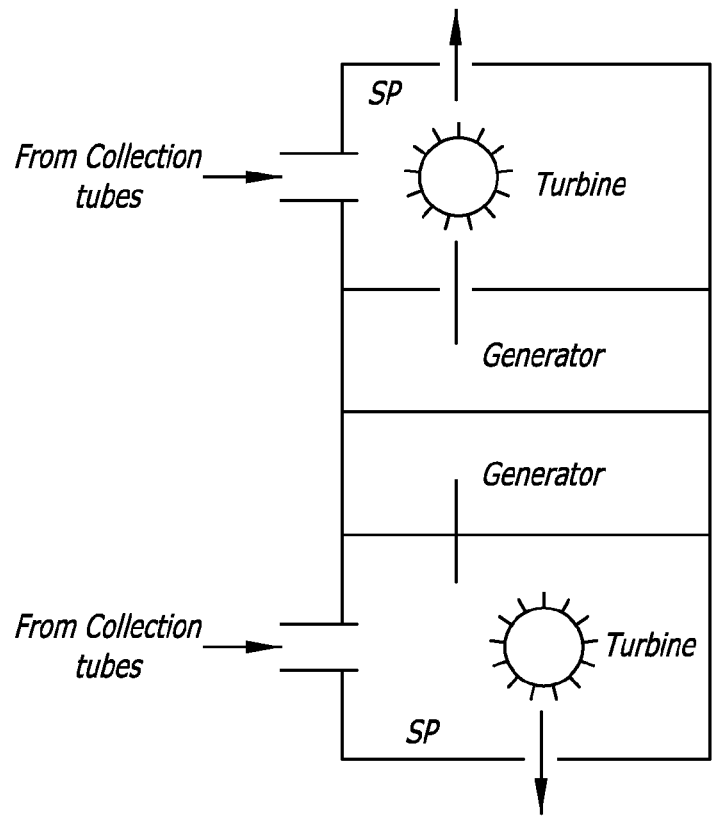
FIG. 16
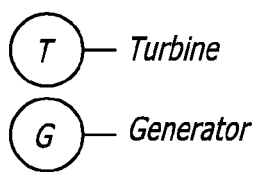
S.P.=Swamp Pump; water out
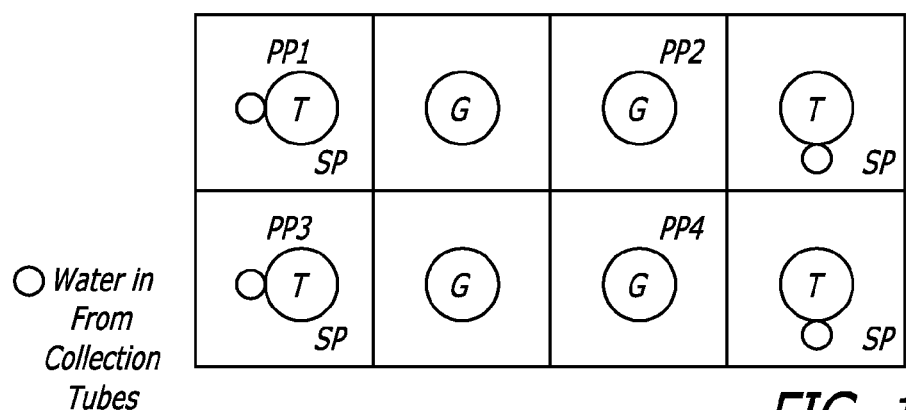
FIG. 17

FIG. 20

CHART ONE
All in inches

| Diameter | Radius | Circumference | Area | Warfin Factor* | Friction Loss** |
|---|---|---|---|---|---|
| 0.125 | 0.0625 | 0.3927 | 0.0123 | 31.9 | |
| 0.250 | 0.1250 | 0.7854 | 0.0491 | 16.0 | |
| 0.375 | 0.1875 | 1.178 | 0.1198 | 9.83 | |
| 0.50 | 0.259 | 1.571 | 0.1963 | 8.0 | |
| 0.75 | 0.375 | 2.356 | 0.4418 | 5.3 | |
| 1.0 | 0.50 | 3.142 | 0.7854 | 4.0 | |
| 1.5 | 0.75 | 4.172 | 1.767 | 2.36 | |
| 2.0 | 1.0 | 6.283 | 3.142 | 2.0 | |
| 3.0 | 1.5 | 9.425 | 7.068 | 1.33 | |
| 4.0 | 2.0 | 12.57 | 12.57 | 1.0 | |
| 5.0 | 2.5 | 15.71 | 19.64 | 0.800 | |
| 6.0 | 3.0 | 18.85 | 28.27 | 0.667 | |

*The Warfin Factor is calculated by dividing the circumference by the area. This number indicates the relative amount of exposure to the interface (circumference) of the mixing tubes. Thus, the higher the Warfin Factor, the more likely a subset of water (ex. a water subset of .001 of an inch cubed) will contact with greater frequency the inner surface of mixing tubes.

**Highly dependent on materials used for the mixing tubes.

FIG. 21

CHART TWO
All in inches (and feet)

| Diameter | Circumference | Area | 1 Gallon (231 cubic inches) | | Resistance and Friction Loss | Best net Benefit |
|---|---|---|---|---|---|---|
| | | | Inches | Feet | Dependent on Materials used | Subjective Decision |
| 0.25 | 0.7854 | 0.0491 | 4,705 | 392 | | |
| 0.50 | 1.571 | 0.1963 | 1,177 | 98 | | |
| 0.75 | 2.356 | 0.4418 | 523 | 44 | | |
| 1.0 | 3.142 | 0.7854 | 294 | 24.5 | | |
| 1.5 | 4.172 | 1.767 | 131 | 10.9 | | |
| 2.0 | 6.283 | 3.142 | 73.5 | 6.125 | | |
| 3.0 | 9.425 | 7.068 | 32.7 | 2.7 | | |
| 4.0 | 12.57 | 12.57 | 18.4 | 1.5 | | |
| 5.0 | 15.71 | 19.64 | 11.8 | 1.0 | | |
| 6.0 | 18.85 | 28.27 | 8.1 | 0.7 | | |

The interface is where all the action takes place in the Osmosis World. The interface is the inner surface of the tube. When the device is level, the waters will mix and so long as the head pressure remains constant and is sufficient to overcome resistance, the device will continue to operate with accelerating velocity taking place in the mixing tubes as the waters travel to the turbine room.

Example:

Assume a 6" brine line descending into the ocean. Below the surface, it is split into 16 1.5 inch lines which run horizontal and parallel with each other for a distance to be determined (hopefully far enough for the waters to triple in quantity and this triple in velocity) where they will then be collected into X number of lines for the turbines.

In the above scenario, the interface increases from 18.85 to 66.75 (16x4.172=66.75), an increase of over 354 %. The total area remains the same; thus no pressure drop.

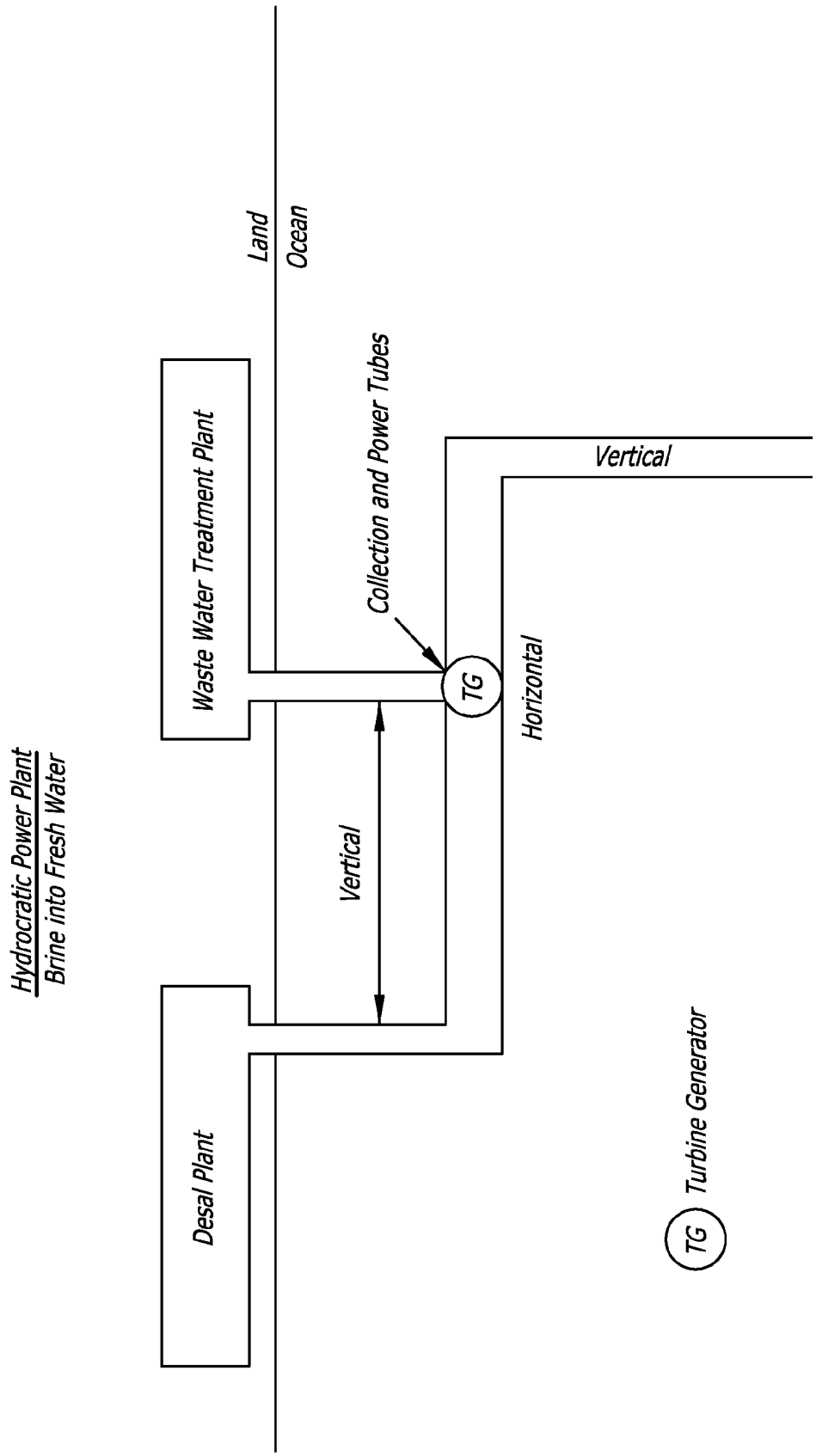

Hydrocratic Power Plant
Salt Water Sink, aka Salton Sea

TG — Turbine Generator
SSW — Salton Sea Water
FW — Fresh Water
——— — Solid Pipe
---- — Membrane Inner Tube

HYDROCRATIC GENERATOR WITH MEMBRANE WALL

CROSS REFERENCE TO RELATED APPLICATIONS

This application is a continuation in part application of U.S. patent application Ser. No. 14/444,707 filed Jul. 28, 2014, which claims the benefit of U.S. Provisional Patent Application No. 61/858,827 filed Jul. 26, 2013, the contents of which are incorporated herein by reference in their entirety.

FIELD AND BACKGROUND OF THE INVENTION

The basic technical concept behind the hydrocratic generator is the spontaneous mixing of two water or other fluid streams that differ in their salinities. Thermodynamics teaches that when two aqueous solutions with different concentrations of solutes make contact with each other, there is a driving force for the solutes from each solution to diffuse into the other until the concentrations are the same throughout the combined liquid. The energy driving this mixing is described by thermodynamics as the free energy of mixing, and it is believed that the energy is mostly contributed by the entropy of mixing. That driving force can usually be calculated from thermodynamic equations which are well known and date back to the late 19th century.

One example of that driving force in action is osmosis, which is slow because of the slow diffusion of material back through the membrane separating the two liquids. One objective is to derive a way to cause that mixing to take place much faster, fast enough to generate a moving stream of water. In just one of many embodiments, various experiments which have been carried out in this regard tend to show that the hydrocratic generator makes it possible to mix about 30 volumes of sea water with 1 volume of fresh water in just a few seconds. This is an example only, and the actual mixing ratios will of course differ from one system to another based on the size, construction and configuration of the hydrocratic generator.

SUMMARY AND DESCRIPTION OF THE INVENTION

According to one aspect of the invention, there is provided a hydrocratic device comprising: a substantially horizontal outer tube having a open inlet end and a open outlet end, the outer tube being located in a body of water having a first salinity; an inner tube located within the outer tube and defining a space between the outer tube and the inner tube, the inner tube having an inlet end connectable to a source of water having a second salinity, an outlet end having a closure means which can be opened and closed, the inner tube comprising a wall at least a part of which is an exchange medium whereby water in the inner tube flows through the wall into the space between the inner tube and the outer tube.

Preferably, the inner tube and the outer tube are generally circular in cross-section and the space between the inner tube and the outer tube is an annular space. The exchange medium may extend along substantially the entire wall of the inner tube and may comprise a membrane, a wire cage and cloth membrane combination, a pliable sheet, and/or an exchange facilitating sheet. Preferably, the exchange medium further facilitates water flow from the space into the inner tube.

In one embodiment, the hydrocratic device comprises propulsion means for driving water from the body of water into the space defined between the outer tube and the inner tube.

The hydrocratic device may comprise an array of outer tubes, which may be connected to a manifold at their inlet ends. At least some of the array of inner tubes may converge into collector tubes, and the outer tubes, inner tubes and collector tubes may be dimensioned so that the flow rate is substantially unchanged as the water passes through the tubes.

In one form, the array comprises four sets of inner tubes and outer tubes, each of the four sets having four inner and outer tubes. Each of the four sets may converge into a single collector tube.

Preferably, the outlet end of the outer tube connects to a further discharge pipe, and the inlet and has closure means. The exchange medium may comprise very small holes which do not allow passage of salt but do allow passage of water, or a cut or slice which do not allow passage of salt but do allow passage of water.

According to another aspect of the invention, there is provided a hydrocratic device comprising: a substantially horizontal outer tube having a open inlet end and a open outlet end, the outer tube being located in a body of water having a first salinity; a plurality of collector tubes located within a body of water, the collector tubes having an inlet end connectable to a source of water having a second salinity, an outlet end having a closure means which can be opened and closed, the inner tube comprising a wall at least a part of which is an exchange medium whereby water in the inner tube flows through the wall into the space between the inner tube and the outer tube.

The hydrocratic device, according to one aspect of the present invention, takes the design of these devices to another step. As illustrated in the accompanying drawings which may comprise just one of many embodiments, fresh water from, for instance but not limited to, a sewage treatment facility, is led into the hydrocratic device of the invention which may be submerged in sea water, but which may also of course be salt water in a bay or inland sea. By fresh water is meant water with salinity much less than found in the sea water (which is typically 3.4 wt %).

Osmosis, especially as it relates to cellular entities in biology, may be defined as the spontaneous net movement of solvent molecules through a partially permeable membrane into a region of higher solute concentration, in the direction that tends to equalize the solute concentrations on the two sides. A solvent is a substance that dissolved a solute, resulting in a solution. In the present invention, the universal solvent water is the solvent, and salt or sodium chloride is the primary solute in the aqueous solution. The solute can be in a liquid, solid or gas phase and is chemically different from the solvent or water. Solid Salt dissolves in water. Water with higher or lower concentrations of salt is readily miscible in other aqueous solutions. By solution is meant a homogeneous mixture of a liquid phase. When salt dissolves in water, it dissociates into its respective ions.

Embedded in the definition of osmosis is the term "partially permeable membrane", which refers to a semi-permeable membrane or selectively permeable membrane. Selectively permeable membranes allow a known set of molecules (or ions) to freely move through it by diffusion. Biological systems regularly use this approach to move material into and out of cells. Osmotic power takes advantage of the potential energy available upon mixing of two fluids with a gradient in salinity, for example the difference in salt concentration or salinity between river water and sea water. Various technologies have been proposed to extract this renewable energy resource. A hydrocratic generator extracts the free energy of mixing between two bodies of water having different salinity concentrations. The advantage of this technology was the lack of membrane required to recover energy from a wide variety of environments.

During operation of an ocean upwelling device, the quantity of upwelling flow was in excess of the energy put into the system in terms of hydraulic head and buoyancy. By reducing the salinity at depth, water could be delivered to the surface ocean rich in nutrients, thus fertilizing the immediate area. Using a modified upwelling device where fresh water was introduced into a tube established that the total hydraulic energy output of the system significantly exceed the input from buoyancy and hydraulic head. The excess energy is attributable to the release of osmotic potential energy upon mixing of the fresh water and the salt water. The term hydrocratic generator is applied to the apparatus.

The present invention comprises a means of capturing the power available in mixing two aqueous solutions with different salinities or concentrations of salt. The method extracts energy from this unexploited renewable energy source.

The invention incorporates a compact delivery system into a water body with high salt content that encourages the mixing of the influent into the water body and rotates a turbine to generate electricity. The current configuration with a smaller footprint attempts to optimize the contact of the hypersaline solution with the lower saline solution in a shell and tube arrangement. In this embodiment, there is provided porous walls of the inner ducts or narrow tubular closed channels which carries the hypersaline fluid into the device. This allows passage of the lower saline solution into the hypersaline fluid. In such an arrangement, the volume within the tube will increase. As the pressure within the inner tube will not increase due to the porous nature of the wall that will not constrain any increase in pressure, only the volume will increase. This could be optimized by selection of appropriate materials and design considerations, thereby increasing the total flow through the tube due to thermodynamic driving forces.

Thin-film composites are regularly manufactured for reverse osmosis. The invention describes a method for making such membranes for use in forward osmosis.

Membranes may include at least in graphene, aquaporins, carbon nanotubes and other new potential membrane materials. It must be remembered that these are substitute materials, not substitute processes.

Osmotically driven membrane processes make use of the osmotic pressure difference created by a concentrated draw solution to drive water across a selective barrier (e.g., a semi-permeable thin polymeric film). To achieve ideal performance in osmotically driven membrane processes, certain membrane characteristics need to be customized.

A generator may use the ocean as a plenum. There are many options and configurations of the device which may be used in this particular application. In one form of the invention, brine from a desalinization plant is provided by a pipe or brine line, and the mixing in this hydrocratic generator occurs in the modified end of that pipe. In essence, the ocean acts as the plenum chamber in the invention discussed above. Holes or inlet openings through the wall of the tube allow for the flow from the ocean to the entering brine or other liquid, and the mixed solutions exit through the end of the tube. The diameter of the tube may be adjusted for efficiency. Again, the design and placement of the holes can be designed in such a way to optimize mixing volumes, and again a power generator can be attached to the open exit end.

It will be appreciated that this design as described herein could be used for generating power from fresh or waste water by placing a "U-bend" in the supply tube upstream from the mixing zone, performing the mixing in the upward vertical section, and the like.

BRIEF DESCRIPTION OF THE DRAWINGS

Reference is made to the accompanying drawings, in which:

FIG. 2A is a section through line A-A in FIG. 1 of the drawings;

FIG. 2B is a section through line B-B in FIG. 1 of the drawings;

FIG. 2C is a section through line C-C in FIG. 1 of the drawings;

FIG. 3 is a schematic side view of a hydrocratic generator in accordance with a further aspect of the present invention;

FIG. 4A is a section through line A-A in FIG. 3 of the drawings;

FIG. 4B is a section through line B-B in FIG. 3 of the drawings;

FIG. 16 is a schematic top view of a hydrocratic power plant illustrating turbines and generators;

FIG. 17 is a front view illustrating schematically the turbines and generators;

FIG. 20 is a chart with information relating to mixing tubes of different dimensions;

FIG. 21 is a chart with further information relating to mixing tubes of different dimensions and characteristics;

FIG. 23 is a schematic representation of a hydrocratic power plant illustrating a different configuration of collection and power tubes.

DETAILED DESCRIPTION OF THE INVENTION

Reference is now made to the accompanying drawings which show various embodiments of the hydrocratic generator having a generally horizontal orientation and the membrane between watertight of different salinity, in accordance with aspects of the present invention.

Figure 1:
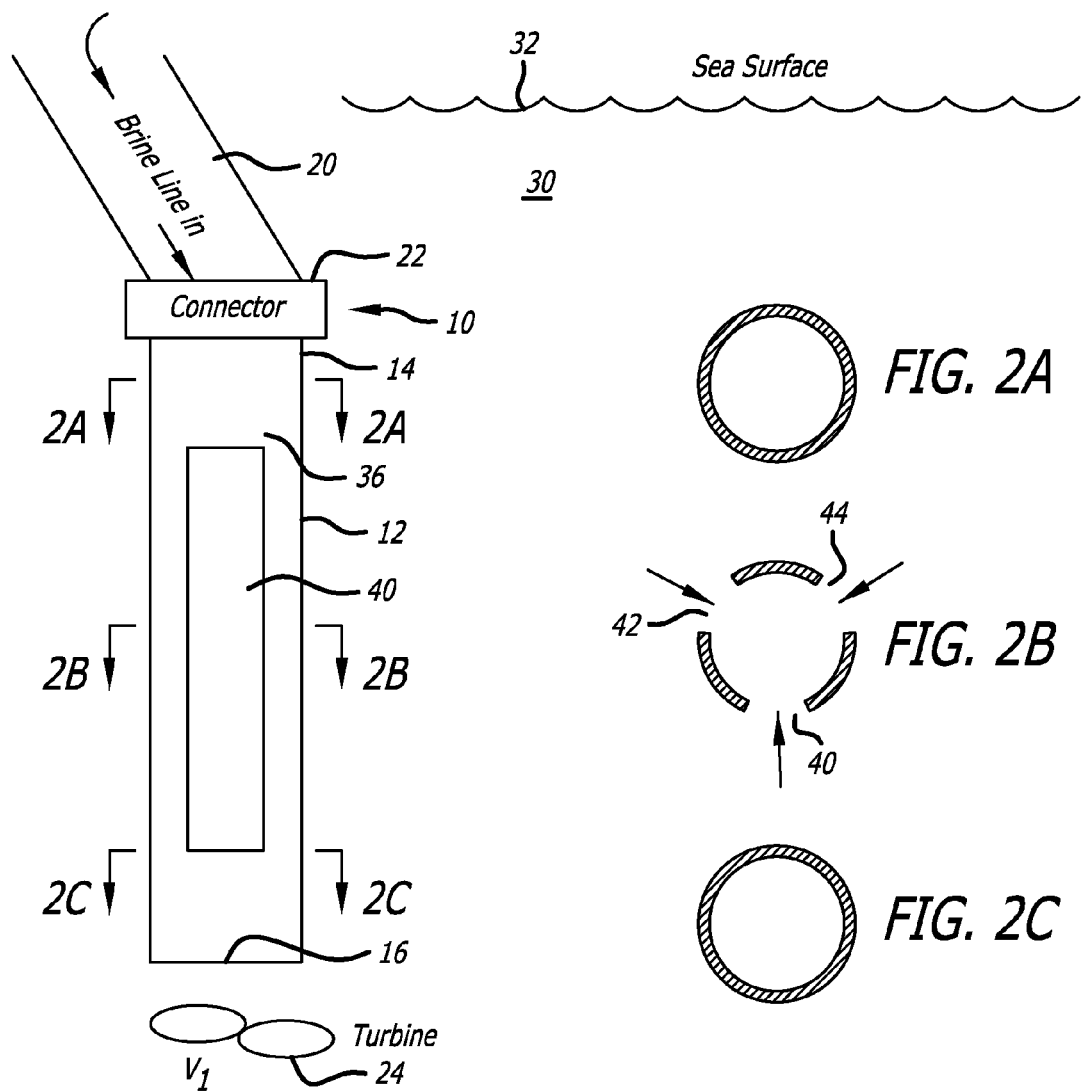
FIG. 1 is a schematic side view of a hydrocratic generator in accordance with one aspect of the invention.

In FIG. 1 of the drawings, there is shown a hydrocratic generator 10 comprising a vertical pipe 12 having an upper end 14 and a lower end 16. A brine line 20 is connected near the upper end 14 of the vertical pipe 12 by means of an appropriate connector 22. A turbine 24 is located near the lower end 16, and the turbine 20 is driven by the force of the water mixed within the vertical pipe 12 upon its exit from the lower end 16. The hydrocratic generator 10, and particularly the vertical pipe 12, is placed in the ocean 30, at a distance beneath the sea surface 32.

The vertical pipe 12 comprises in one embodiment a circular wall 36. Within the circular wall 36, there are formed three equi-spaced vertical openings 40, 42 and 44. In this particular embodiment, each of the vertical openings 40, 42 and 44 extends a significant distance between the upper end 14 and the lower end 16. Furthermore, in this embodiment, the width of each of the vertical openings 40, 42 and 44 may be approximately one sixth of the diameter of the vertical pipe 12, as best seen in the cross section shown in FIG. 2B of the drawings. This will result in each vertical opening having a solid or close part of the pipe on its opposite side of the pipe. It should, of course, be noted that the length and width of the vertical openings 40, 42 and 44 are not in any way limited or restricted to the dimensions and configuration shown in the drawings. Not only can the size of a rectangular vertical opening be varied in a multitude of different ways, but the opening itself is not necessarily of rectangular configuration. The shape of such openings may include, but are not limited to, openings which are square, rectangular, circular, triangular, or even a nonconforming shape not of any particular designation.

The brine line 20 introduces to the vertical pipe 12 water of a particular salinity, which may fall into a wide range of possibilities. The brine line 20 introduces the water into the upper end 14 of the vertical pipe 12, passing through the connector 22. This water is urged downwardly in the vertical pipe 12. As this water moves downwardly, ocean water is drawn into the vertical pipe 12 through at least some, and potentially all, of the vertical openings 40, 42 and 44. The ocean water mixes with the water introduced from the brine line 20, and the differing salinities therebetween produce the necessary effect, and the accelerated mixture is discharged through the lower end 16. The emerging mixture may drive the turbine 24 to generate power in conventional fashion.

FIG. 2A of the drawings shows the cross-section through the vertical pipe 12 through line A-A, where there is an absence of any openings, and this figure therefore shows a completely closed portion of the vertical pipe 12. FIG. 2B shows a section through the vertical pipe 12 at lines B-B in FIG. 1, schematically illustrating the position of the vertical openings as described above, including an inlet facing a solid part of the pipe 12. FIG. 2C of the drawings shows a section through the vertical pipe 12 near its lower end 16, again illustrating the absence of the vertical openings 40, 42 and 44 and the existence of a solid pipe 12 at that point.

Reference is now made to FIG. 3 of the drawings, which shows a hydrocratic generator 100 in accordance with a further aspect of the present invention. The hydrocratic generator 100 comprises a tubular pipe or chamber 102 having an upper end 104 and a lower end 106. The chamber 102 is, as indicated above, tubular or circular in cross-section, but need not be tubular or cylindrical. In different embodiments, the tube may have square, rectangular, oval or other shapes in cross-section, as may be considered most desirable in any given situation.

The tubular chamber 102 comprises three equi-spaced vertical inlets 110, 112 and 114. These vertical inlets 110, 112 and 114 are somewhat similar in shape and dimension to those described with respect to FIG. 1 of the drawings, but this is purely for illustrative purposes, and differently configured vertical inlets may have other shapes and dimensions. Moreover, while three equi-spaced vertical inlets are shown in this and other figures, there may be both fewer and more than three such inlets. Moreover, the inlets need not be spaced equally apart from each other, but any one inlet can be closer to or further apart from adjacent inlets than other inlets in the tubular chamber 102.

The tubular chamber 102 is surrounded by a plenum or outer wall 120. An annular space 122 is formed between the outer surface of the tubular chamber 102 and the inner surface of the outer wall 120. The outer wall 120 has near the lower end 126 thereof an opening 128 which receives a pipe 130 for delivering fresh water from a freshwater source.

A turbine 134 is placed adjacent the upper end 104 of the chamber 102, for purposes already described in a previous embodiment, and which will be briefly mentioned again below. The hydrocratic generator 100, including the tubular chamber 102 and the outer wall or play number 120 is located in the ocean 140, below the ocean surface 142. It will also be noted that the turbine 134 will be located below the ocean surface 142 just above the upper end 104 of the tubular chamber 102, strategically placed to capture energy by the force of the emerging mixture.

Brief reference is made to FIGS. 4A and 4B of the drawings. FIG. 4A is a schematic cross-section through the chamber 102 and plenum 122 through lines A-A illustrated in FIG. 3 of the drawings. FIG. 4A thus illustrates the presence of the inlet openings 110, 112 and 114. Also seen in these figures is the outer plenum 120, and the annular space 122 which is defined therebetween.

In operation, the hydrocratic generator 100 in accordance with this aspect of the invention mixes freshwater delivered from a source and ocean water extracted from the ambient ocean in which the hydrocratic generator 100 is located. The freshwater is introduced to the hydrocratic generator 100 by means of the pipe 130 into the opening 128. The freshwater then fills the annular space 122 formed between the tubular chamber 102 and the outer plenum 120. This freshwater then passes into the interior of the tubular chamber 102 through the vertical inlets 110, 112 and 114. At the same time, ocean water is drawn in through the lower end 106 of the tubular chamber 102. The ocean water passing through the tubular chamber 102 mixes with the freshwater in the tubular chamber 102, which is drawn into the chamber 102 through the vertical inlets 110, 112 and 114. The ocean water and fresh water are, of course, of differing salinities, and a mixture of these two fluids exits the upper end 104 of the tubular chamber 102. The force of the mixture exiting the hydrocratic generator 100 may be used to drive a turbine 134, strategically located near the upper end 104, and this in turn may be used to generate power, in accordance with conventionally known apparatus and principles.

As will be noted from the devices described above, different types of hydrocratic generator 100 are illustrated in accordance with the present invention. In a one type, brine is introduced into ocean water, and in another, freshwater is introduced into salt or ocean water. Another option which would fall within the scope of the invention would be the use of salt water introduced into fresh water. It should be noted that the invention is not limited to any particular type of fluid being introduced into another. Rather, the invention uses fluids of different salinity, and mixes these fluids in a manner which discharges the mixture from the device such that the force of the discharge can be captured by a turbine or other instrument and used for generating and or storing power.

The illustrated embodiments of the invention in FIGS. 1 to 4 show three vertical inlet openings but the invention is not to be construed as limited to such an arrangement, as discussed further below. One possible advantage of three vertical openings is, as mentioned, that each opening is directly across from a solid part of the tube. However, any number of vertical openings may be used, and the optimal arrangement may in fact be dictated according to the surroundings, use of fluids of different salinity, dimension of the device and such other factors. Moreover, although rectangular shaped vertical inlet openings are illustrated herein, the invention is, once more, not limited to such a shape. As mentioned, the openings may be square, rectangular, triangular, oval or any other shape that is found to be usable and efficient in a given arrangement.

Reference is now made to FIGS. 5 to 11 of the accompanying drawings, which show yet further embodiments of a hydrocratic generator in accordance with various aspects of the invention.

Figure 5:
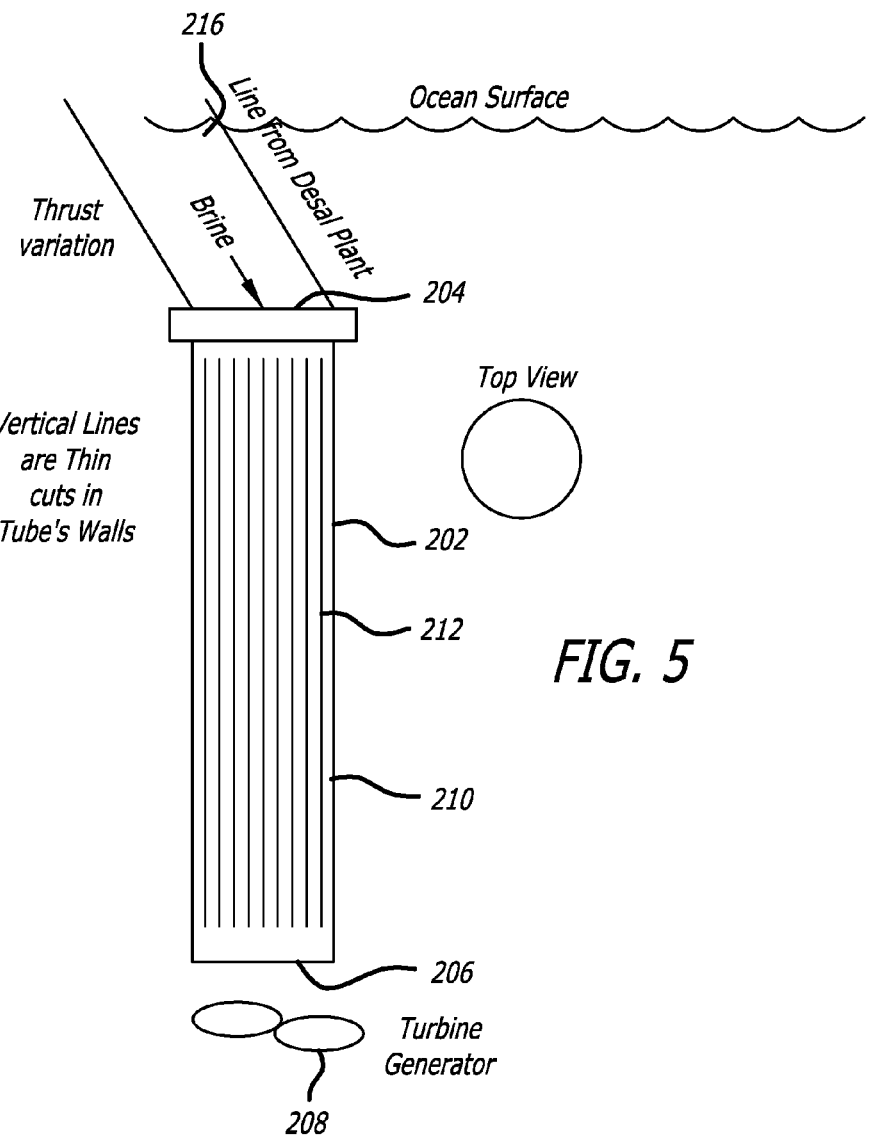
FIG. 5 is a schematic side view of a part of a hydrocratic generator in accordance with a further aspect of the invention including vertical lines comprising thin slits.

FIG. 5 of the drawings shows a tube 202 of generally elongate cylindrical shape, although other shapes may be used in accordance with the invention. The tube 202 has an upper end 204 and a lower end 206. The tube 202 defines a brine line passage 216 through which brine, or another fluid, supplied from a source flows. In the example of FIG. 5, brine flows from the upper end 204 towards the lower end 206. Adjacent to the lower end 206, a turbine generator 208 is located so that power can be generated from the reaction of the hydrocratic generator, in accordance with the principles and details described above.

The tube 202 is comprised of a wall 210, and the wall 210 has a plurality of thin slices or slots 212. The tube 202 is located in the ocean 214 and is surrounded by sea or ocean water. In the embodiment shown in FIG. 5, the plurality of thin slices or slots 212 are substantially the same size and the same width along their length. Brine introduced at the upper end 204 of the tube 202 flows downwardly through the passage defined by the tube 202 towards the lower end 206. Water from the ocean surrounding the tube 202 passes through one or more or all of the slots 212 mixing with the brine flowing through the tube 202 to produce the hydrocratic effect. This in turn drives the propeller or other component of a turbine generator to produce energy.

Figure 6A:
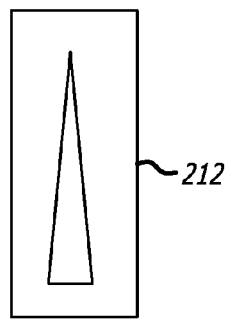
FIGS. 6A and 6B are details of a further variation of a hydrocratic generator similar to that illustrated in FIG. 5 but wherein one or more of such slits widen or taper along their length.
Figure 6B:
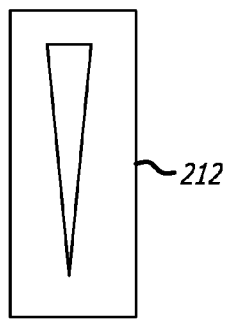

FIGS. 6A and 6B of the drawings show a variation of the arrangement illustrated in FIG. 5. In FIG. 6A, a first variation shows the vertical lines, slots or slices which are broader at the lower end and taper as they move towards the top end of the tube 202. FIG. 6B is yet a further or third variation which shows the slots 212 wider at the top, and tapering to a narrow point near the bottom of the tube 202. Further, the tube 202 may have slots 212 which differ from each other, being selected from the thin cuts of fairly consistent width, or cuts which taper upwardly or downwardly as shown in FIGS. 6A and 6B of the drawings.

It should be noted that the diameter of the tube 202 may be greater than for smaller than the diameter of the brine line 216, or they may in fact be of substantially the same diameter.

Figure 7:
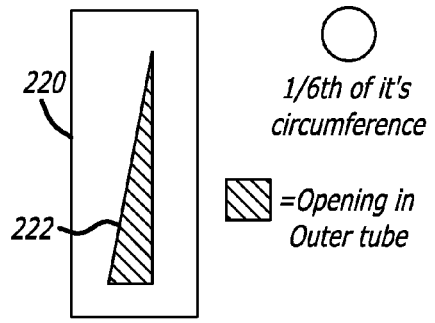
FIG. 7 is a schematic side view of a further embodiment showing an outer tube of a hydrocratic generator which can be rotated.

FIG. 7 of the drawings shows a further arrangement of an outer tube 220 which has an opening 222. In this embodiment, the opening 222 has a substantially vertical edge on one side thereof, and a slightly off-vertical edge on the other so that the opening 222 widens as it progresses down the tube 220. The tube 220 will preferably rotate, in one embodiment in an amount approximately one sixth of its circumference, so that slots may be exposed or closed, as the case may be according to the position of the outer tube, as further described below.

Figure 8:
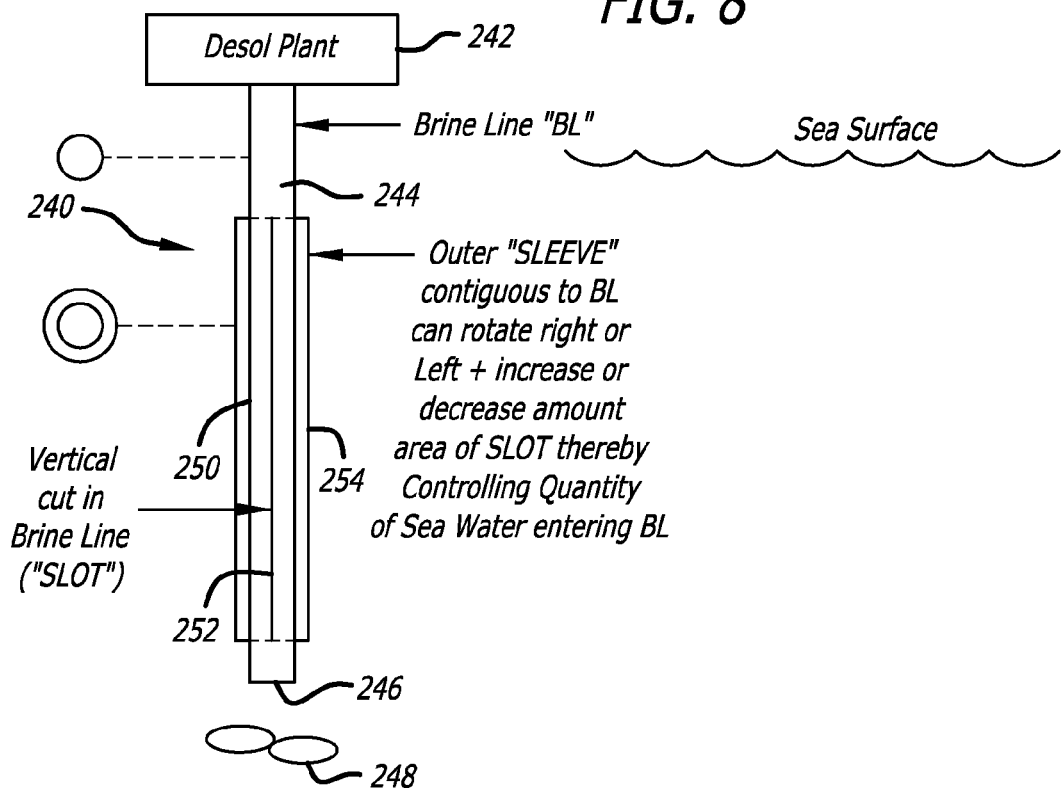
FIG. 8 is a schematic view of a hydrocratic generator comprising a sleeve surrounding a brine line.

FIG. 8 of the drawings shows an embodiment of the hydrocratic generator 240 which is in a substantially vertical position below the surface of the ocean, and within the ocean. A plant such as a desalination plant 242 is the source of fluid, which is conveyed to the hydrocratic generator 240 through a brine line 244. The brine line extends downwardly and has an open lower end 246. A propeller or other part of a turbine generator 248 is located below the lower end 246 so as to generate power or energy, as described.

The brine line 244 leads into a tube 250, which includes a vertical cut 252. The tube 250 is surrounded by an outer sleeve 254 which is contiguous to the brine line or tube. The outer sleeve can rotate to the right or left, or clockwise or counterclockwise, which will have the effect of increasing or decreasing respectively the area of the vertical cut 252, or slot, thereby controlling the quantity of sea water entering the tube 250. It should be noted that the tube 250 may simply be the extension or a part of the brine line 244. There may be more than one slot in the tube or brine line. If so, the sleeve will preferably have openings which are equal in number to the vertical cuts or slots in the tube, each of such openings corresponding to and controlling the extent of opening of its corresponding slot.

Figure 9:
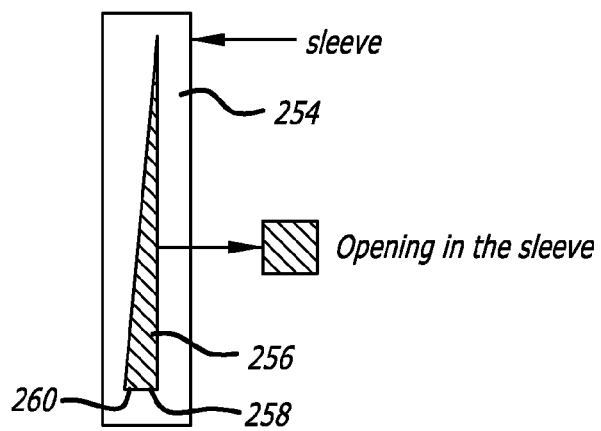
FIG. 9 is a detail of an alternative embodiment of an outer sleeve surrounding an inlet line.

FIG. 9 of the drawings shows a detail of an opening 256 in the sleeve 254. This opening 256 tapers from a narrow point near the top to a slightly broader base at the bottom 258. Such tapering may of course extend in the opposite direction, or there may be no tapering at all, or the opening may be of other desired shape. In use, the lower left corner 260 of the opening 256 is to the right of the slot in the tube 250. As the sleeve rotates clockwise, an increasing area of the slots in the tube 250 will open and become exposed to sea water, until the opening 256 provides full access of the slot 212 over its entire area to the sea water. In order to close and cease operation, the sleeve 254 is rotated counterclockwise. The closing, if complete, will cease the operation, but partial closing allows controlling of the extent of operation by manipulating the amount of exposure of the slots 212, and thereby the amount of ocean water which is able to enter the tube 250.

Figure 10:
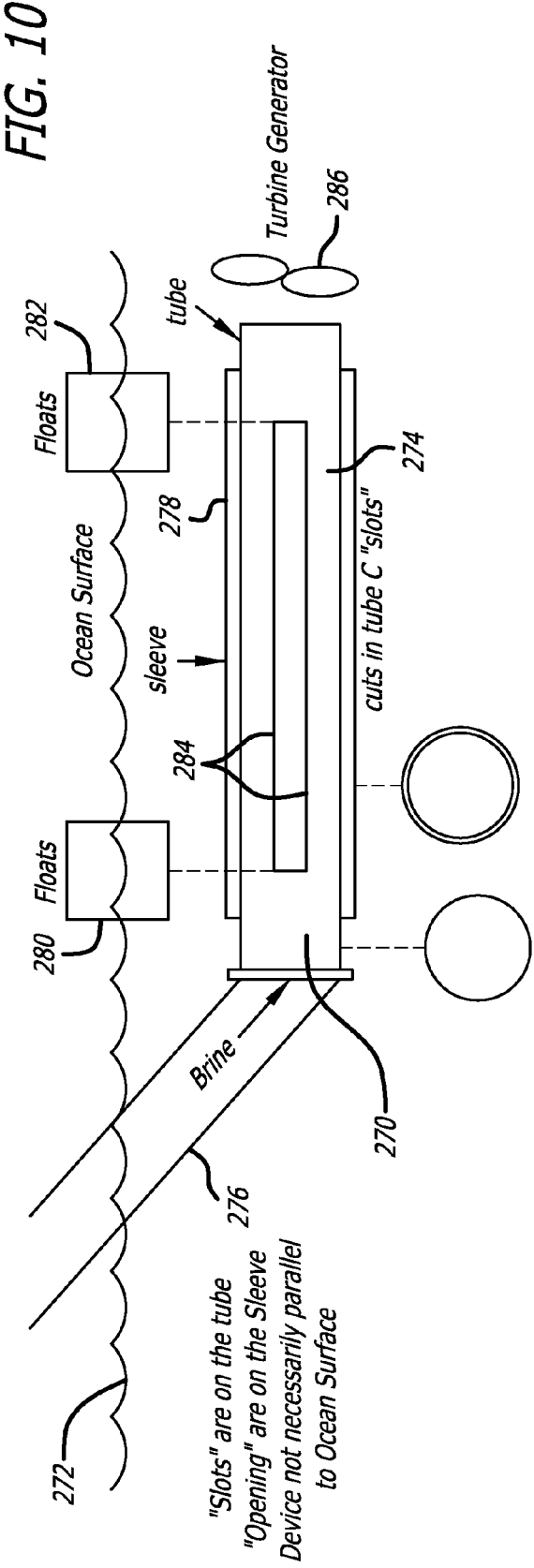
FIG. 10 is a schematic view and description of a substantially horizontally located hydrocratic generator including sleeve.

Reference is now made to FIG. 10 of the drawings which shows a hydrocratic generator 270 below the ocean surface 272, and mounted in a generally horizontal orientation. The hydrocratic generator 270 includes a tube 274 which receives brine from a brine line 276. A sleeve 278 surrounds the tube 274 along most of its length. In the embodiment shown, the tube 274 and sleeve 278 are supported by a pair of floats 280 and 282 so that they are suspended in the ocean at a predetermined and desirable distance below the ocean surface. A turbine generator 286 is located at or near the end of the tube 274, at the end remote from that to which the brine line 276 is connected to the tube.

The tube 274 has a plurality of cuts 284 along its length. The sleeve 278 is contiguous to the tube 274, and can rotate in either direction, so as to increase or decrease the exposure area of the slots or cuts 284 formed in the tube 274. The extent of movement will determine how much of the slots 284 are covered or uncovered, and the exposure thereof to the ocean water through such slots. Of course, the more uncovered or open the slot, the more ocean water will be able to enter the tube 274, and vice versa. The sleeve 278 may be rotated to a selected position(s) so as to partially cover the slot 284 so as to permit manipulation and control of the amount of water entering the tube 274.

There may be several slots 284 formed in the tube 274, and the sleeve 278 will typically have openings therein, one such opening corresponding to each slot in the tube 274. Rotation of the sleeve 278 will therefore increase or decrease the exposure of each slot, according to the position of the sleeve 278 relative to the tube 274, and the slots therein.

FIG. 10 also shows near the bottom thereof in schematic view for alternative openings on the sleeve 278. These openings may be tapered in different manners, or formed in different positions on the sleeve. These openings are exemplary only, and not intended to limit the scope of the invention to such shapes and sizes.

Figure 11:
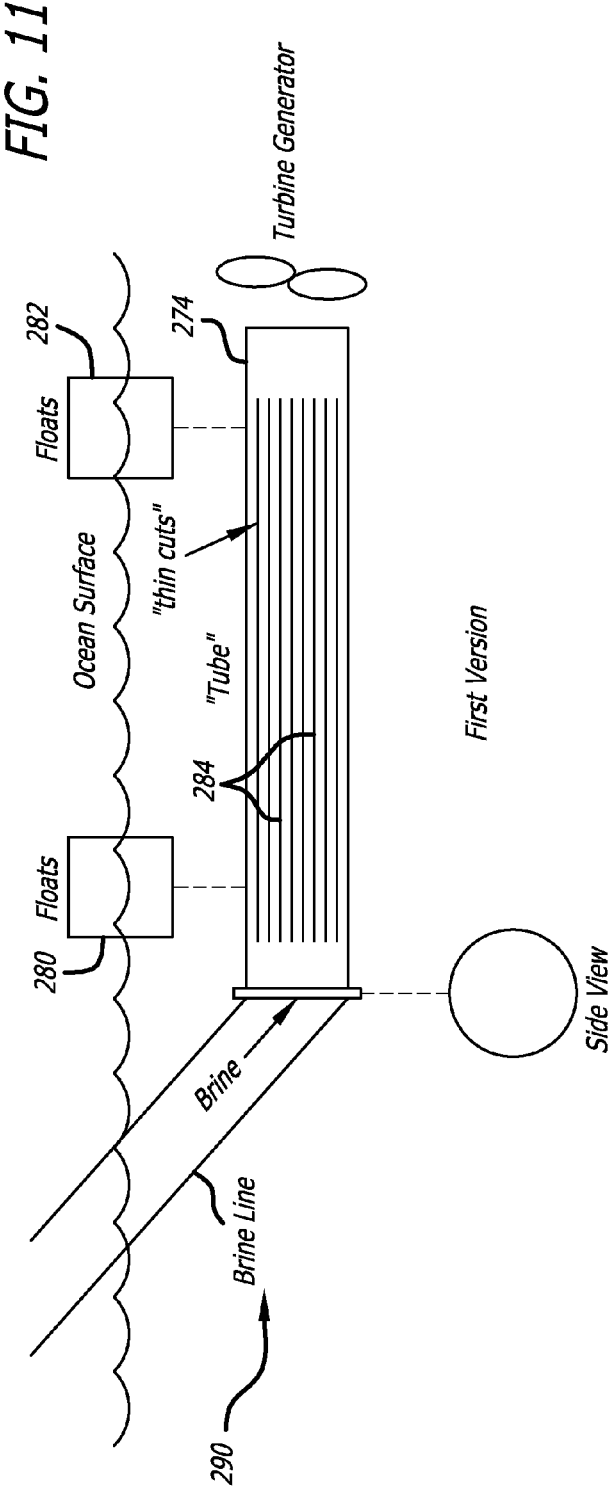
FIG. 11 is a schematic view and description of a substantially horizontally located hydrocratic generator showing details of the tube having multiple slots.

FIG. 11 of the drawings shows a hydrocratic generator 290, which is somewhat similar to that shown in FIG. 10 of the drawings. In FIG. 11, the tube 274 is suspended from the floats 280 and 282. The sleeve is not shown in this figure. The tube 274 has a plurality of thin cuts 284. The diameter of the brine line may be greater, smaller, or substantially the same as that of the tube 274.

In one version or embodiment, the horizontal lines shown in the tube 274 are thin cuts in the tube wall. There may be fewer, or no, thin cuts in the lower portion of the tube. In another version, the thin cuts are configured so that they widen as a near the exit of the tube, as shown in FIG. 11. In yet a further illustrated version, the thin cuts narrow as they approach the exit of the tube 274, toward the turbine 290. It should be noted that the tube 274 need not be fully horizontal relative to the ocean surface, but maybe angled or otherwise tilted as desired.

Figure 12A:
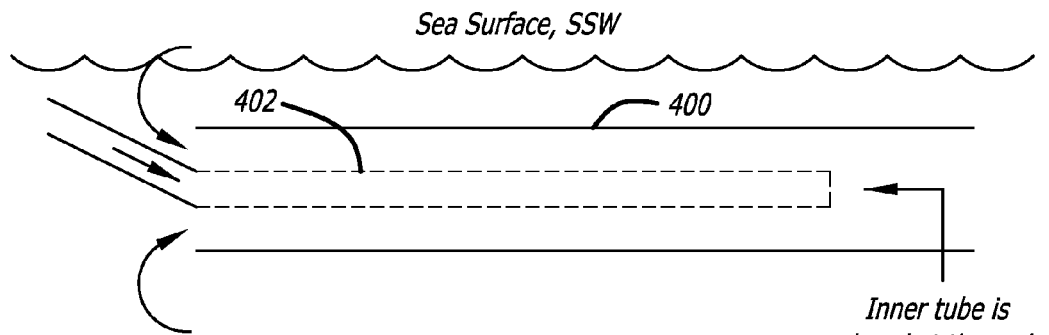
FIGS. 12A and 12B are hydrocratic generators for a saline, landlocked lake.
Figure 12B:
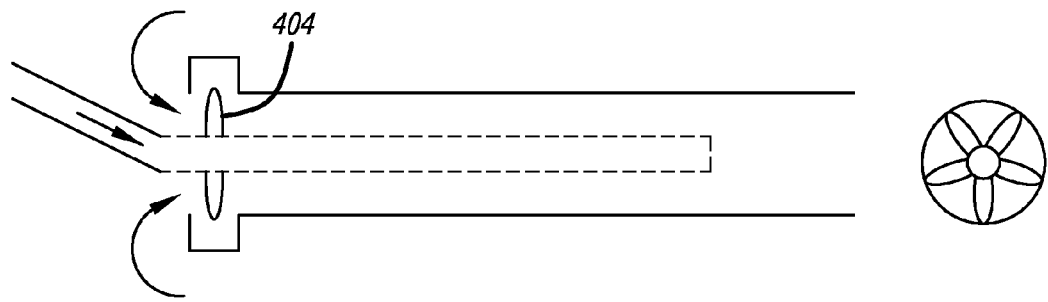

FIGS. 12A and 12B are diagrams of a hydrocratic generator which may be used in the context of a saline, landlocked lake. The hydrocratic generator is placed in a substantially horizontal orientation below the surface of Salton sea water. The hydrocratic generator comprises an outer tube 400 which is more or less horizontal, and an inner tube 402 contained therewithin. The outer tube 400 is open at both ends and sea water can flow therethrough from one open end indicated with the arrows, and out through the other open end. The inner tube 402 is open at one end and receives an input of water, which may be fresh water from a stream, at its one end. The other end of the inner tube is closed, or at least capable of being closed. The only mechanism by means of which the input of water can be discharged from the inner tube 402 when the respective end is closed is through the membrane or porous wall of the inner tube. The wall may be membranous or of a porous nature along all or a part or parts of its length. Water flows between the inner and outer tubes through this member or porous walls. In the embodiment illustrated in this drawing, the fresh water is thus in a separate tube or membrane located inside a larger tube with solid walls. The freshwater has a good head as it may be taken from a stream coming into a sea, such as the Salton Sea, from a higher elevation. The nature, construction and configuration of the membrane or porous wall which may be used will be discussed further below.

FIG. 12B shows a configuration of a hydrocratic generator which is in many respects similar to that described in FIG. 12A, but including the provision of spinning blades 404 which help to move the water through the outer tube and increase the flow rate.

FIGS. 13 to 19 show various diagrammatic representations and features of a hydrocratic power plant. Common to these hydrocratic power plants is the use of power tubes which are located below the surface of the water, and are placed in a generally horizontal orientation.

Figure 13:
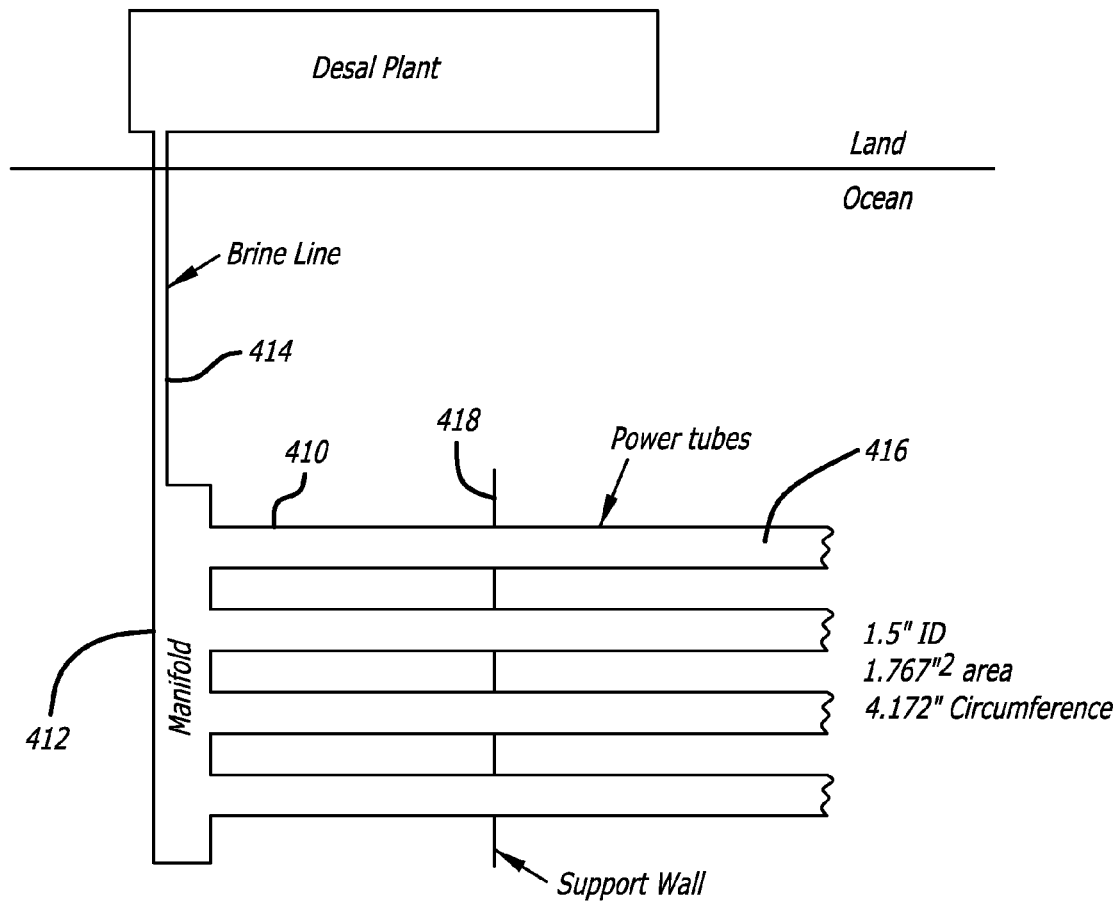
FIG. 13 is a schematic view of a hydrocratic power plant including multiple power tubes.

FIG. 13 of the drawings shows a general representation of a hydrocratic power plant in accordance with the invention and which includes horizontal tubes in the ocean, and a desalination plant on land. In this embodiment, sixteen power tubes 410 are shown, although only four are seen in this embodiment, the remaining power tubes 410 being located behind those illustrated. The power tubes 410 are connected to a manifold 412 which is supplied through a brine line 414 from a desalination plant 416. The power tubes 416 are supported by means of a support wall 418 which maintains the power tubes in their correct configurations and positions relative to each other. The salinity difference between the ocean water and the water flowing through the power tubes from the desalination plant causes water to flow through the walls of the power tubes, which are comprised of a membrane, porous wall or other medium which facilitates the exchange between water on each side of the walls, the mixing thereof driving the water to create the generated power from the system.

Figure 14:
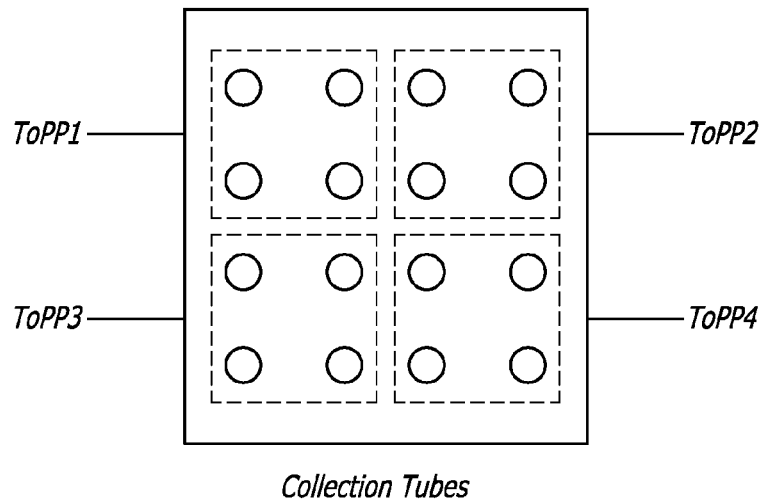
FIG. 14 is an front view of a portion of a hydrocratic power plant illustrating the support wall.
Figure 15:
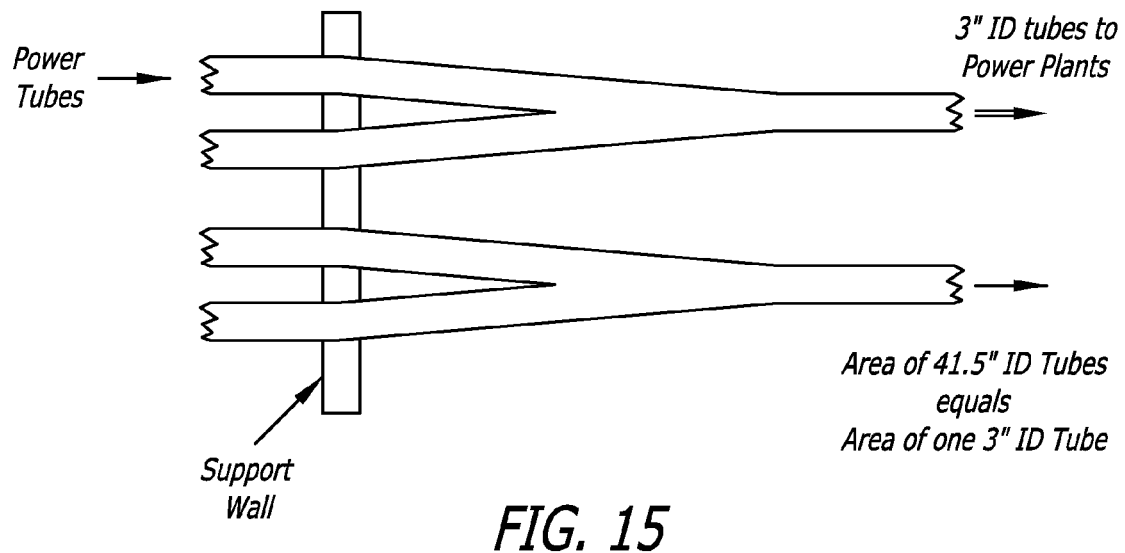
FIG. 15 illustrates schematically collection tubes for a hydrocratic power plant.

FIG. 14 shows a front view of a support for the array of collection tubes, in this embodiment grouped in four units of four. As indicated in this figure, a group of four collection tubes would go to a first power plant, while each of the remaining three groups of collection tubes would go to second, third and fourth power plants. The various collection tubes are held in position by an appropriate support wall. In FIG. 15 of the drawings, there is shown schematically the collection tubes for use. Each of the collection tubes joins with other collection tubes and, in the embodiment illustrated, four collection tubes of 1.5 inch in a diameter tubes joins with another as it is fed into a tube of 3 inches in a diameter for onward transmission to the power plant. A second support for supporting the power tubes just upstream of the juncture point is provided, as illustrated.

FIGS. 16 and 17 show schematic representations of power plants including positioning of turbines and generators. FIG. 16 illustrates the configuration where collection tubes are fed into a unit including a turbine, and the turbine is driven by the flow of the incoming water mixture and produces power which is thereafter transferred to a generator for use as required. The unit containing the turbine has an exit or outlet for discharge of the water mixture. In the embodiment illustrated in FIG. 16 of the drawings, two collector tubes are shown feeding two units containing the turbines and associated generators respectively, both comprising the first and second power plants.

FIG. 17 of the drawings shows a front view generally of the arrangement illustrated in FIG. 16, showing the four power plants, each comprising a unit including the turbine which receives the incoming water mixture, and the generator associated with the turbine in each case. The water exits the unit containing the turbine through a sump pump or other appropriate outlet which may conveniently be used in various embodiments of the invention.

Figure 18:
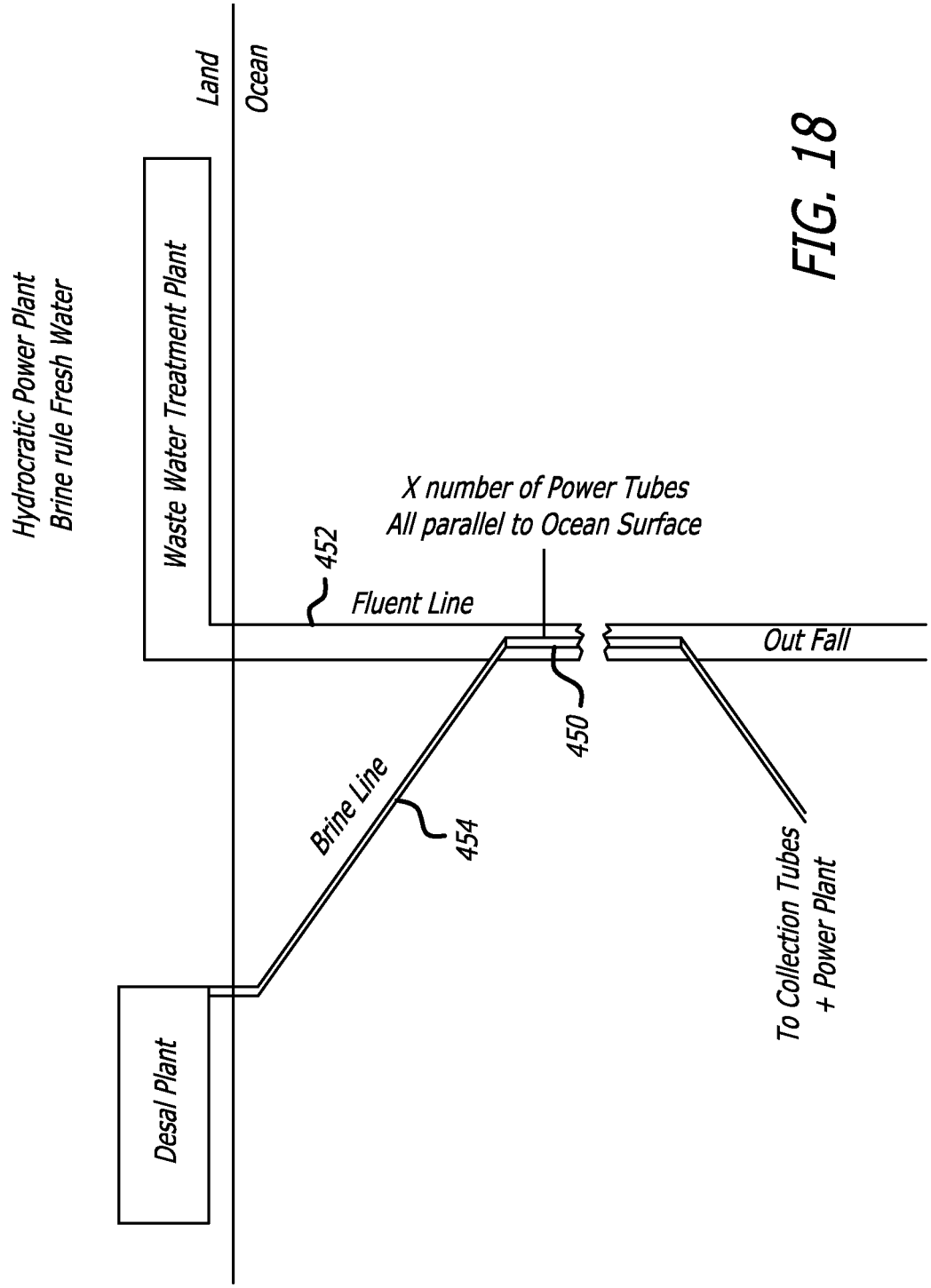
FIG. 18 illustrates schematically a hydrocratic power plant including multiple power tubes substantially parallel to the ocean surface.

FIG. 18 of the drawings illustrates an overview of the hydrocratic power plant including power tubes generally parallel to the ocean surface. Power tubes or other rail power tubes located at area 450 are contained within an effluent line 452 from a wastewater treatment plant. Within the effluent line 452, the array of power tubes are provided with water from a desalination plant by means of a brine line 452. The collection tubes eventually continue to a power plant, which may be of much the same type and configuration as those which have been described above.

Figure 19A:
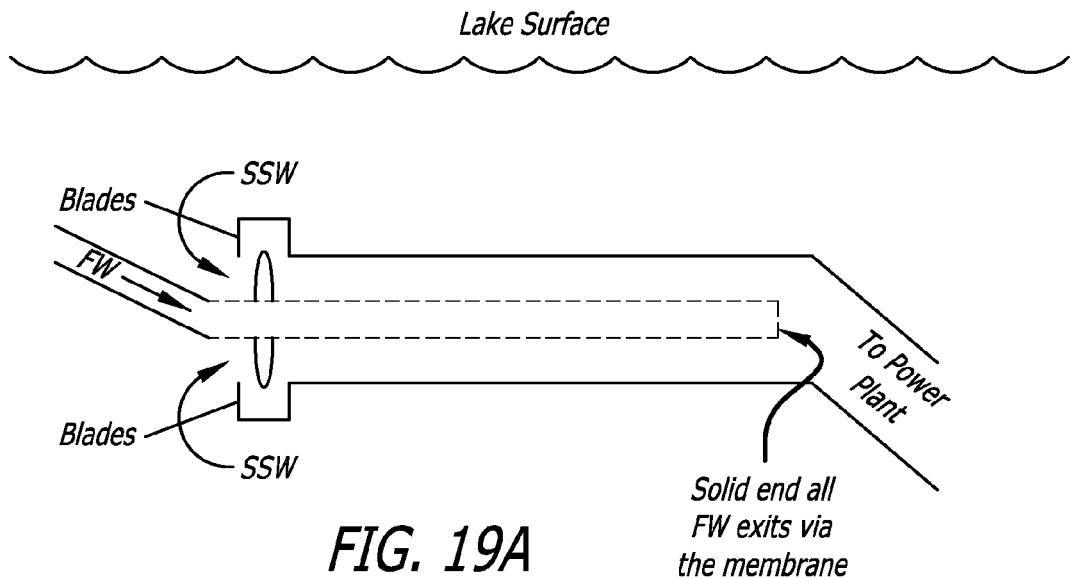
FIG. 19A and FIG. 19B illustrates schematically a hydrocratic power plant including a membranous type inner tube.
Figure 19B:
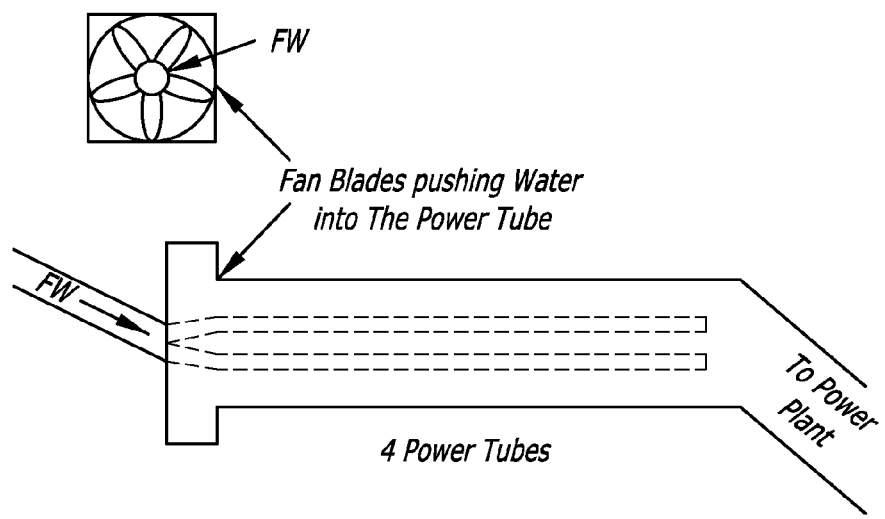

FIGS. 19A and 19B illustrate a further embodiment of the power plant in a saltwater lake including the use of fan blades for pushing water into the power tube. FIG. 19A is similar to an embodiment shown above, and includes blades for increasing the flow of water into the outer tube. The inner tube has a porous wall or a wall comprised of a membrane which facilitates the exchange of fluids between the inner tube and the outer tube based on the differing salinities of the water. Note that the inner tube in FIG. 19A has a closed end, but in certain embodiments of the invention, the end may be movable between an open and closed position. Thus, the end may be maintained in the open position while introducing fresh water into the inner tube, and maintained that way until the inner tube is filled with such fresh water, and any other water therein has been expelled. Thereafter, the end of the inner tube would be closed so that the necessary exchange through the wall of the inner tube can be used to produce the necessary mixture, and increase flow for driving turbines and providing power to a generator. FIG. 19B shows a similar arrangement, but wherein two inner tubes are provided, each having the wall with the membrane allowing the necessary exchanges which occur as a result of the differing salinities of the water in the respective locations.

FIGS. 20 and 21 show various charts and information relating to power tubes and other hardware used in accordance with one aspect and various embodiments of the invention.

In an embodiment of the invention, the volume flow rate through the tubes will increase as one moves from input to output and therefore the tubes may be made larger as they go across to increase volume without increasing flow resistance and back pressure such an increase in diameter can be smooth and progressive, but it may also be a series of steps moving, for example, from a half inch, to three quarters of an inch, to 1 inch, etc.

Porous walls may be used to allow the sea water to mix into the brine. Many materials may be used in such a situation, such as cloth, denim or canvas, or dozens of wall materials may be used.

Figure 22:
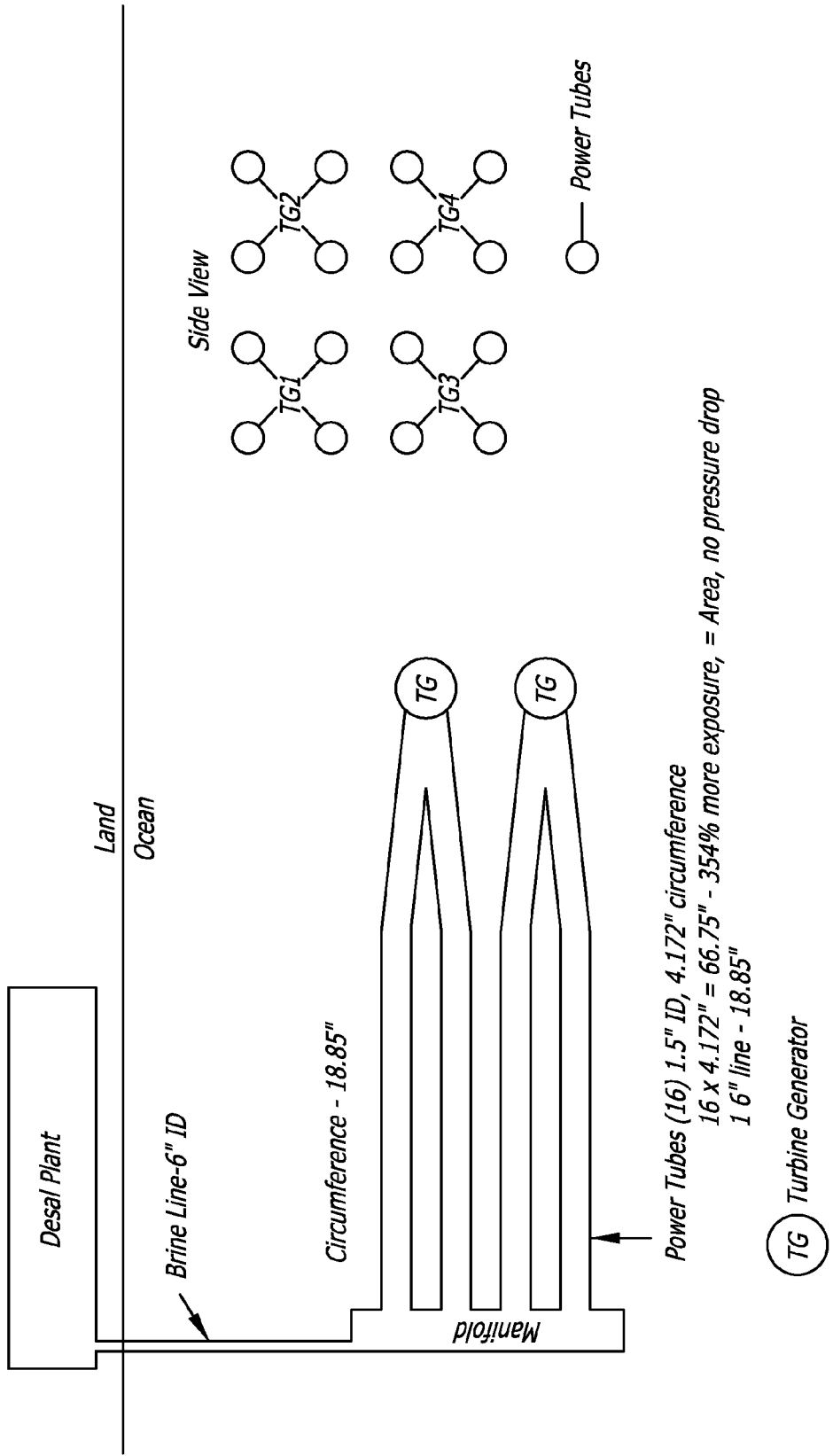
FIG. 22 is a schematic representation of a hydrocratic power plant illustrating multiple tubes feeding turbine generators.

FIGS. 22 to 24 show further schematic features and information relating to a hydrocratic power plant in accordance with a further aspect of the invention. FIG. 22 shows a brine into sea water arrangement including a manifold and tubes, with turbine generators appropriately positioned. FIG. 22 shows a particular embodiment of tubes located in a body of water, each connected to a manifold and provided with water from a desalination plant. The collection tubes are placed in an ocean body of water, where the water is of different salinity to that flowing into the collection tubes from the desalination plant. The difference in salinities increases the flow rate of water in the collection tubes, which junction together and are ultimately used to drive a turbine and generator. This figure includes schematic representations showing sixteen collection tubes comprised by four arrays each of four collection tubes.

FIG. 23 shows a hydrocratic power plant using brine into fresh water including a collection of horizontal and vertical power tubes. A horizontal tube is provided containing the collection and power tubes, and water from a desalination plant is introduced into the collection tubes, causing exchanges due to difference in salinity with water from a wastewater treatment plant which is in the outer tube. Appropriate turbines and generators are provided to capture the energy and store the power produced as a result thereof.

Figure 24A:
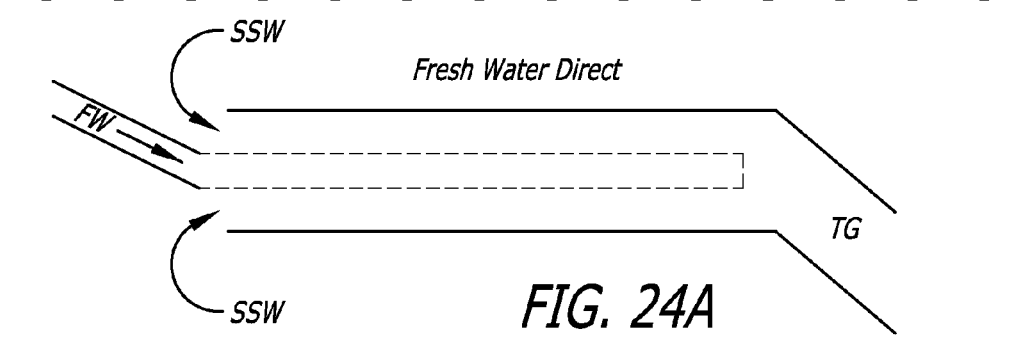
FIGS. 24A, 24B and 24C are schematic representations of a further hydrocratic power plant with a substantially horizontal orientation and serious forms of power tubes.
Figure 24B:
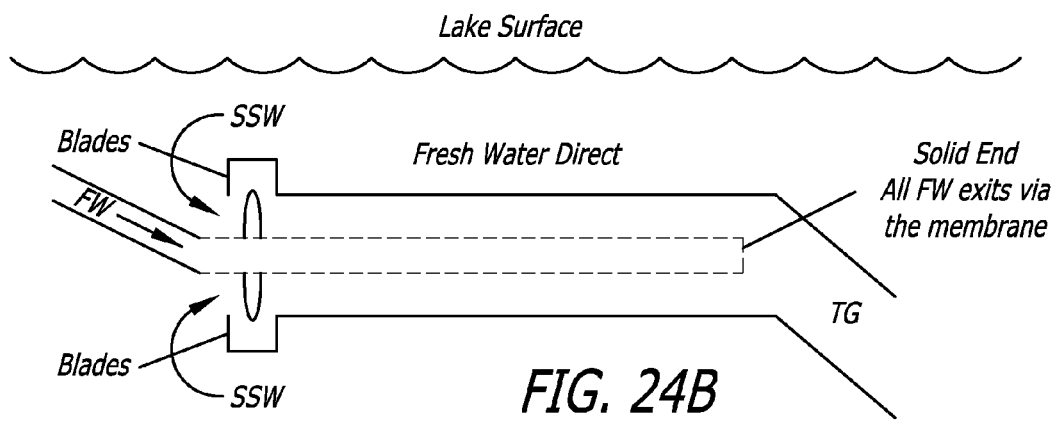
Figure 24C:
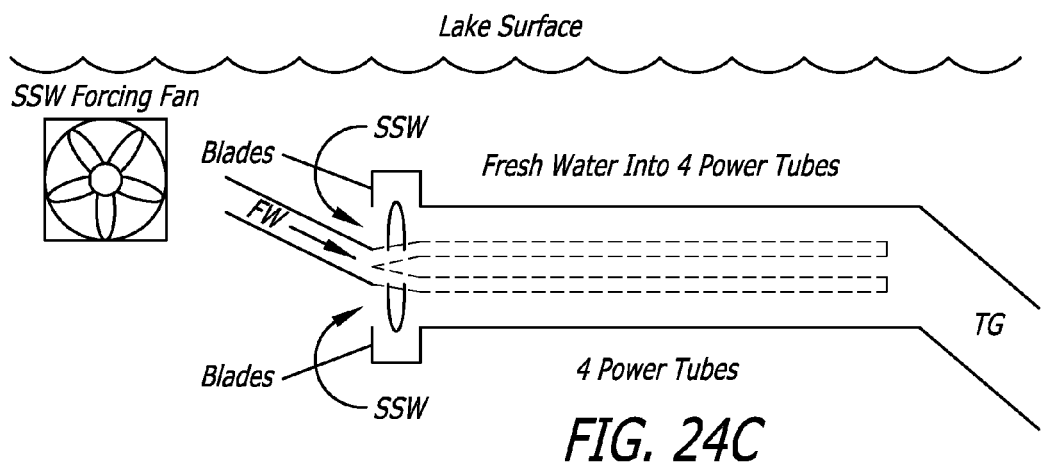

FIGS. 24A, 24B and 24C illustrate schematically three types of hydrocratic power plant in a saltwater sea, such as the Salton Sea, including the use of fresh water into a substantially horizontal pipe, fresh water into a single inner tube with porous membrane, and multiple tubes for the flow of fresh water contained in the outer tube. Power tubes, or a plurality of such power tubes, including a fan and selectively positioned turbine generators produce power as described with reference to other embodiments above.

It will be appreciated that the hydrocratic generator according to the present invention provides a membranous or porous wall separation, and may be in the form of an inner tube located within a generally horizontal outer tube, the inner tube having the wall which operates as an exchange medium between water of different salinity. In another embodiment of the invention, the hydrocratic generator comprises a generally horizontal tube which comprises the wall having membranous or porous characteristics to enable the exchange of water, but there is no outer tube. In this arrangement, the tube itself is provided with water of a first salinity, and the tube is located in water of a second salinity. The exchange and water flow is facilitated through the wall of the tube as a result of the difference in salinities between the water on each side of the wall of the tube.

One aspect of the invention relates to the composition of the coverings that may be used to keep the NaCl in the power tubes and allow the sea water (SW) of fresh water (FW) to enter into the tubes. These may be considered as coverings generally, as well as membranes in certain circumstances. Covering would include membranes, semi permeable membranes, plastics, cloth of any kind, carbon nanotube in supportive matrix or other nanotechnology enhanced membranes. The purpose of the covering is to enclose the exterior of the power tubes and one of its purposes is to keep the NaCl (brine) in the tube and yet allow Fresh Water (FW) or water of a lesser salinity (for example SW) to enter the tube. It would be in order if a relatively small amount of the NaCl exits the tubes as long as a much larger amount of FW or SW enters the tubes. One possible embodiment may be a "defective" semi permeable membrane. The covering may, in one embodiment, be mounted upon a circular tube made out of a wire that can withstand the pressure created by the device. Many thin cuts in the covering may be used, and/or a multitude of small holes in the covering may be created.

In one embodiment, the brine into sea water design takes the brine from a 6" brine line and divides it into 16 1.5 inch "power tubes". These 16 1.5 inch "power tubes" may collectively contain the same amount of brine as is present in the 6' brine line, i.e. the total area of the 16 tubes equals the area of the 6" tube. However, the contact area of the brine with the ocean is about 354% more with the 16 inch tubes than the contact area of the 6 inch tube. The contact area is determined by the circumference of the pipes.

TG is used in the drawings to identify a turbine-generator design. The turbine consists of something that spins a rod as the water exits the power tubes (propellor, paddle wheel, etc.). The rod may connect to a generator which may be waterproof and transmits the electricity to the shore by underwater cables.

The drawings also illustrate a hydrocratic power plant for a salt water sink (for example, Salton sea, a shallow, saline, endorheic rift lake located in the Imperial and Coachella valleys). There are other such salt water sinks in the world. The fresh water input may come from a water line that comes from an uphill check dam that is installed on one of the three "rivers" that drain into the lake. Thus, the fresh water may then have enough head height to continuously operate. However, in order for the salt water to run through the device, a "pushing fan" may be needed to force the salt water into device. This "fan" may have a hole in the middle for the fresh water pipe line and may be by powered an electric motor on its outer edge.

One issue is that of back pressure. There may be enough "front pressure" to keep the brine moving through the devices coming from a desal plant because the desal plant is located on land above sea lever while the device itself is below sea level (see different approach above re the "Salton Sea plant").

As an alternative to the turbine generator arrangement, the turbine and the generator can be located in a dry room below sea lever so that the mixture from the power tube strikes the turbine in air space. There is less back pressure in a dry room. An underwater room also needs a dry mechanism for getting in and out of the room. Thus, there may be a tunnel going back to shore or a tube up through the water to above the surface. One answer for this approach may be to make this underwater room attached to a pier. This is probably most applicable to the brine into fresh water device. The invention is intended to embrace three alternatives (dry room including the turbine and generator and a dry room for the generator only and a dry room for the turbine only).

In accordance with the invention, there is the possibility of using a venturi type affect just before the waters impact the turbine.

In regards to the brine into fresh water (effluent) power plant, the outfall may be constructed so that there is plenty of room for the power tubes, collection tubes and waterproof generator to be inside the outfall. The outfall downstream of the TG has to be large enough to handle the flows from the desal plant and the waste water treatment plant.

In one embodiment, all of the fresh water tubes in the Salton Sea arrangement, or indeed other arrangements, may be plugged at the end thereof.

The hydrocratic generator in accordance with the present invention is therefore one which is disposed in use at a generally horizontal orientation. The essence of the hydrocratic generator of the invention is the provision of a membrane or porous wall between two fluids of different salinity. The membrane may be on the pipe wall, or form part of a pipe wall. In this specification, the term membrane is intended to encompass a broadly defined medium that allows the exchange of water of different salinities located on each side of the membrane, allowing the liquids to come into contact with each other. The membrane is thus an exchange medium or surface, and may have many different forms. These may include a pliable sheet, an exchange facilitating sheet, a wire cage with cloth or other material and the like.

The membrane may therefore be a functional medium which has the effect of facilitating communication and exchange between waters or other liquids of differing salinity on each side of the membrane.

According to one aspect of the invention, there is provided a hydrocratic device comprising an inner pipe, an outer pipe, and an annular chamber between the inner and outer pipes, a feed inlet to the annular chamber, and a membrane in the wall of the inner pipe. In one form, the inner pipe is closed at one end thereof. A power generator may be located at either one or both of such ends.

The hydrocratic device may be located in the ocean, and the feed inlet provides fluid of different salinity from another source.

In one embodiment of the invention, the feed inlet may have a branched portion for discharging a part of the aqueous solution therein into the space defined by the inner pipe. The branched portion may be controlled by a valve or manifold so that such discharge into the inner pipe may be selectively controlled.

According to another aspect of the invention, there is provided a hydrocratic generator comprising a generally horizontal solid pipe and an inner tube, and annular space formed between the solid pipe and the inner tube, the solid pipe receiving a first aqueous solution and the inner tube receiving a second aqueous solution, the inner tube facilitating mixing between the first and the second aqueous solution.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A hydrocratic device comprising:
   a substantially horizontal outer tube having a open inlet end and a open outlet end, the outer tube being located in a body of water having a first salinity; and
   an inner tube located within the outer tube and defining a space between the outer tube and the inner tube, the inner tube having an inlet end connectable to a source of water having a second salinity, an outlet end having a closure means which can be opened and closed, the inner tube comprising a wall at least a part of which is an exchange medium whereby water in the inner tube flows through the wall into the space between the inner tube and the outer tube.

2. A hydrocratic device as claimed in claim 1 wherein inner tube and the outer tube are generally circular in cross-section and the space between the inner tube and the outer tube is an annular space.

3. A hydrocratic device as claimed in claim 1 wherein the exchange medium extends along substantially the entire wall of the inner tube.

4. A hydrocratic device as claimed in claim 1 wherein the exchange medium comprises a membrane.

5. A hydrocratic device as claimed in claim 1 wherein the exchange medium comprises a wire cage and cloth membrane combination.

6. A hydrocratic device as claimed in claim 1 wherein the exchange medium comprises a pliable sheet.

7. A hydrocratic device as claimed in claim 1 wherein the exchange medium comprises an exchange facilitating sheet.

8. A hydrocratic device as claimed in claim 1 wherein the exchange medium further facilitates water flow from the space into the inner tube.

9. A hydrocratic device as claimed in claim 1 further comprising propulsion means for driving water from the body of water into the space defined between the outer tube and the inner tube.

10. A hydrocratic device as claimed in claim 1 comprising an array of outer tubes.

11. A hydrocratic device as claimed in claim 10 wherein the array of inner tubes are each connected to a manifold at their inlet ends.

12. A hydrocratic device as claimed in claim 10 wherein at least some of the array of inner tubes converge into collector tubes.

13. A hydrocratic device as claimed in claim 12 wherein the outer tubes, inner tubes and collector tubes are dimensioned so that the flow rate is substantially unchanged as the water passes through the tubes.

14. A hydrocratic device as claimed in claim 10 wherein the array comprises four sets of inner tubes and outer tubes, each of the four sets having four inner and outer tubes.

15. A hydrocratic device as claimed in claim 14 wherein each of the four sets converges into a single collector tube.

16. A hydrocratic device as claimed in claim 1 further comprising a turbine and generator which are driven by the water exiting the outer tube.

17. A hydrocratic device as claimed in claim 1 wherein the outlet end of the outer tube connects to a further discharge pipe, and the inlet and has closure means.

18. A hydrocratic device as claimed in claim 1 wherein the exchange medium comprises very small holes which do not allow passage of salt but do allow passage of water.

19. A hydrocratic device as claimed in claim 1 wherein the exchange medium comprises a cut or slice which do not allow passage of salt but do allow passage of water.

20. A hydrocratic device comprising:
a substantially horizontal outer tube having a open inlet end and a open outlet end, the outer tube being located in a body of water having a first salinity; and
a plurality of collector tubes located within a body of water, the collector tubes having an inlet end connectable to a source of water having a second salinity, an outlet end having a closure means which can be opened and closed, the inner tube comprising a wall at least a part of which is an exchange medium whereby water in the inner tube flows through the wall into the space between the inner tube and the outer tube.

* * * * *